United States Patent [19]
Boudou et al.

[11] Patent Number: 5,568,633
[45] Date of Patent: Oct. 22, 1996

[54] PROCESS FOR MANAGING A HIERARCY OF MEMORIES

[75] Inventors: Alain Boudou, Vert; Anne Kasynski, Mainguerin; Sylvie Lesmanne, Les Clayes Sous Bois, all of France

[73] Assignee: Bull S.A., Louveciennes, France

[21] Appl. No.: 275,383

[22] Filed: Jul. 15, 1994

[30] Foreign Application Priority Data

Jul. 15, 1993 [FR] France ................................ 9308711

[51] Int. Cl.$^6$ ................................................. G06I 13/00
[52] U.S. Cl. .......................... 395/468; 395/471; 395/472; 395/473; 395/447; 395/448; 395/449
[58] Field of Search .................................. 395/447, 448, 395/449, 468, 471, 472, 473, 474

[56] References Cited

U.S. PATENT DOCUMENTS

| 4,445,174 | 4/1984 | Fletcher | 395/448 |
| 5,226,144 | 7/1993 | Moriwaki et al. | 395/468 |
| 5,228,136 | 7/1993 | Shimizu et al. | 395/470 |
| 5,241,664 | 8/1993 | Ohba et al. | 395/474 |
| 5,291,442 | 3/1994 | Emma et al. | 395/447 |

FOREIGN PATENT DOCUMENTS

| 0388032 | 2/1990 | European Pat. Off. . |
| 0434250 | 11/1990 | European Pat. Off. . |
| 0489556 | 6/1992 | European Pat. Off. . |

OTHER PUBLICATIONS

Eggers et al., "Evaluating the Performance of Four Snooping Cache Coherency Protocols", from *Proceedings*, 17 Jun. 1989, No. 3, Washington, US.

Primary Examiner—David L. Robertson
Attorney, Agent, or Firm—Kerkam, Stowell, Kondracki & Clarke, P.C.; Edward J. Kondracki

[57] ABSTRACT

The process for exchanges between the levels in a hierarchy of memories comprising at least one intermediate level in the hierarchy linked to a higher level in the hierarchy and to a lower level in the hierarchy, with each level in the hierarchy being divided into memories (3, 5, 6) which are in turn divided into blocks (10) containing information (11) associated with addresses (Ad), with the blocks of the memories on the higher level and on the intermediate level in the hierarchy containing copies of the information held in the blocks at the corresponding addresses on the lower level in the hierarchy, and during a modification of a piece of information in a block (10.32) of a memory on the higher level in the hierarchy, invalidating at least some of the information at the corresponding addresses of other memories on the higher level in the hierarchy, and managing an update or an invalidation of the information at the corresponding addresses on the intermediate level and the lower level in the hierarchy, depending on the usefulness of the update.

18 Claims, 2 Drawing Sheets

| Number of Blocks With Useless Update | S1 | | |
|---|---|---|---|
| Number of Blocks With Useful Update | S2 | | |
| Protocol Mode | Invalidation | Update | Immediate Invalidation And Retention Of The Update |

PROCESS FOR MANAGING A HIERARCY OF MEMORIES

CROSS REFERENCES TO RELATED APPLICATIONS

This application is related to U.S. application Ser. No. 08/275,377(Bull 3377) in the name of AUTECHAUD et al., and entitled "INFORMATION PROCESSING SYSTEM WITH SHARED MEMORY", which application is filed concurrently herewith and claims priority from French Application No. 93 08710. Said application is assigned to the assignee of the subject application. This application is also related to U.S. application Ser. No. 08/569,857(Bull 3412) in the name of BILLARD et al., and entitled "PROCESSOR NODE", which application is filed concurrently herewith and claims priority from French Application No. 93 08712. Said application is assigned to the assignee of the subject application. The subject matter of the foregoing U.S. applications (Bull 3377 and 3412) is incorporated herein by reference.

FIELD OF THE INVENTION

The present invention relates to a process for coherent management of exchanges between the levels of a hierarchy of memories with at least three levels.

BACKGROUND OF THE INVENTION

Data processing systems are known that are equipped with a hierarchy of memories, so that the most extensive possible memory space will be available, yet not at prohibitive overall cost, particularly by providing levels in the hierarchy in which the fastest memories with costlier technology are of reduced size, and by increasing the size of the memories in contiguous levels in the hierarchy in inverse proportion to their technological cost, or more simply by adopting, on the highest levels in the hierarchy, memory sizes that are just sufficient for the most useful information to be obtained with an apparent average access time on the order of the cycle time of the fastest part of the hierarchy, for a total capacity of the hierarchy equal to the capacity of the lowest level of memory, which generally has the least costly technology but the largest size.

In conventional terminology, it will be recalled that each hierarchy level is divided into memories which in turn are divided into blocks containing information identified by addresses. The addresses on a lowest level in the hierarchy correspond to the locations of the information, while the copies of these pieces of information that are present in the blocks of the other levels of the hierarchy are associated with the same address but are disposed at any arbitrary location determined by the management processor of the memory in question.

This hierarchy of memories poses a problem with managing the coherence of the copies when copies of the same initial piece of information from a block on a lower level can exist and be modified in different blocks on a higher level in the hierarchy.

In order to assure coherence in the management of the information, it is customary, when a piece of information is modified in one block of a higher level, to proceed to either an update or an invalidation of the information contained in the corresponding blocks of a higher level in the hierarchy. The advantage of updating is that it avoids having misses occur during inquiries that are made on this information in the memories that have not generated the modification of information. However, this updating has the drawback of being costly in terms of machine time, since it must be executed individually with each modification and therefore involves a very high rate of messages in the links between the memories. Conversely, invalidation is less costly in terms of machine time since it can be executed just once for several successive modifications of the information, but it reduces the hit ratio of the inquiries in the memories where the information has been invalidated.

In current data processing systems the processing protocol during updating or invalidation is predetermined either by an instruction on the level of the general management system in the hierarchy of memories or by an instruction of the application program. It now turns out that at times it would be preferable to adapt the processing protocol to the requirements so as to optimize the rate of the messages in the links between the levels of memories in the hierarchy.

SUMMARY OF THE INVENTION

One object of the invention is to propose an optimum process for managing the coherence of exchanges between levels in a hierarchy of memories comprising at least one intermediate level in the hierarchy linked to a higher level and to a lower level in the hierarchy.

The process of coherent management according to the invention consists, during a modification of a piece of information in a block of a memory on a higher level in the hierarchy, of invalidating at least some of the information at the corresponding addresses of other memories on the higher level in the hierarchy, and of managing either an update or an invalidation of the information with corresponding addresses on an intermediate level and on a lower level in the hierarchy depending on the usefulness of an update.

Thus the exchanges of messages necessary to the updates are minimized, while pertinent information is retained in the blocks where it could be useful. The process according to the invention is particularly advantageous when the intermediate level in the hierarchy is linked to a higher level in the hierarchy by a low-latency link, for example a 16-byte bus at 50 MHz, and is linked to a lower level in the hierarchy by high-speed links, for example by a link obtained by two serial connections of 2 gigabits per second each. In effect, in this case the low-latency link advantageously allows rapid access to the modified information when necessary, which eliminates the effects due to the slower data rate of this low-latency link while conversely, the higher data rate of the serial links advantageously allows the execution of updates which will subsequently minimize the effects of the strong latency of these links.

In one advantageous version of the invention in connection with a data processing system in which memories at different levels in the hierarchy are grouped into nodes, the blocks with corresponding addresses in the memories on the higher level in the hierarchy in the node to which the modified block belongs are updated, and the blocks with corresponding addresses in the memories on the higher level in the hierarchy in other nodes are invalidated.

Thus, the ease of access to certain memories on a higher level in the hierarchy advantageously allows updating of the corresponding blocks of these memories while minimizing the flow of messages in the rest of the links of the data processing system.

In another aspect of the invention that is intended to further optimize the management of exchanges in connection with a data processing system in which the copies of information held in the blocks with corresponding addresses on an intermediate level in the hierarchy are normally processed according to a protocol in an update mode, a data bit is associated with each block on the intermediate level in the hierarchy; this data bit is put in a first state during a first copy of data or of a data update in this block, and in a second state during a utilization of the data contained in this block, and the blocks at the corresponding address at the intermediate level in the hierarchy are updated during a modification of a piece of information with an address on the lower level in the hierarchy, and the processing protocol is either kept in the update mode or directed to an invalidation mode depending on the usefulness of a preceding update at this address; the usefulness of this preceding is determined as a function of the state the data bits in the blocks with the same address just prior to the update in question.

Thus, when the state of the data bits demonstrates that the updates executed previously were of no use because of the updated information was not used, the processing protocol of the corresponding address is changed to the invalidation mode, thus economizing on the use of updates during later modifications.

In a first implementation of this aspect of the invention, an update threshold is memorized on the lower level; the protocol is kept in the update mode as long as the percentage of the data bits in the second state is at least equal to the update threshold, and the protocol is switched to the invalidation mode when the percentage of data bits in the second state is lower than the update threshold.

In a second implementation of this aspect of the invention, a first threshold and a second threshold are memorized on a lower level in the hierarchy, and the processing protocol is kept in the update mode or is directed to an invalidation mode as a function of an actual number of data bits in the first and second states compared with the first and second thresholds.

In particular, the protocol is directed to the invalidation mode when the number of data bits in the second state is lower than the second threshold.

Preferably, when the numbers of data bits in the first and second states are respectively higher than the first and second thresholds, an invalidation of the information in the blocks on the higher level in the hierarchy is executed immediately while the protocol is kept in an update mode.

In yet another aspect of the invention, associated with each address on the lower level in the hierarchy is a code which evolves as a function of the usefulness of an update when the copies of the information contained in the blocks on the intermediate level in the hierarchy are processed according to a protocol in an update mode, or as a function of the nature of a miss when the copies of the information contained in the blocks on the intermediate level in the hierarchy are processed according to a protocol in an invalidation mode; the usefulness of an update is determined as a function of the state of the data bits, and the nature of a miss is determined by a total absence of information and addresses in the memory on the intermediate level in the hierarchy or by an invalidated piece of information in a block of this memory, and the mode of the protocol is made to evolve as a function of the code of the address in question on the lower level in the hierarchy. Thus ensues a very fine analysis of the actual situation, and it is not only possible to switch from the update mode to the invalidation mode but also to return to the update mode when this proves to be useful as a function of the nature of the misses.

Of course, any of the modes of implementation described below may be used to determine the usefulness of the update.

BRIEF DESCRIPTION OF THE DRAWINGS

Other characteristics and advantages of the invention will become evident upon reading the following description of the preferred versions of the invention in relation to the appended drawings, among which.

Figure 1:
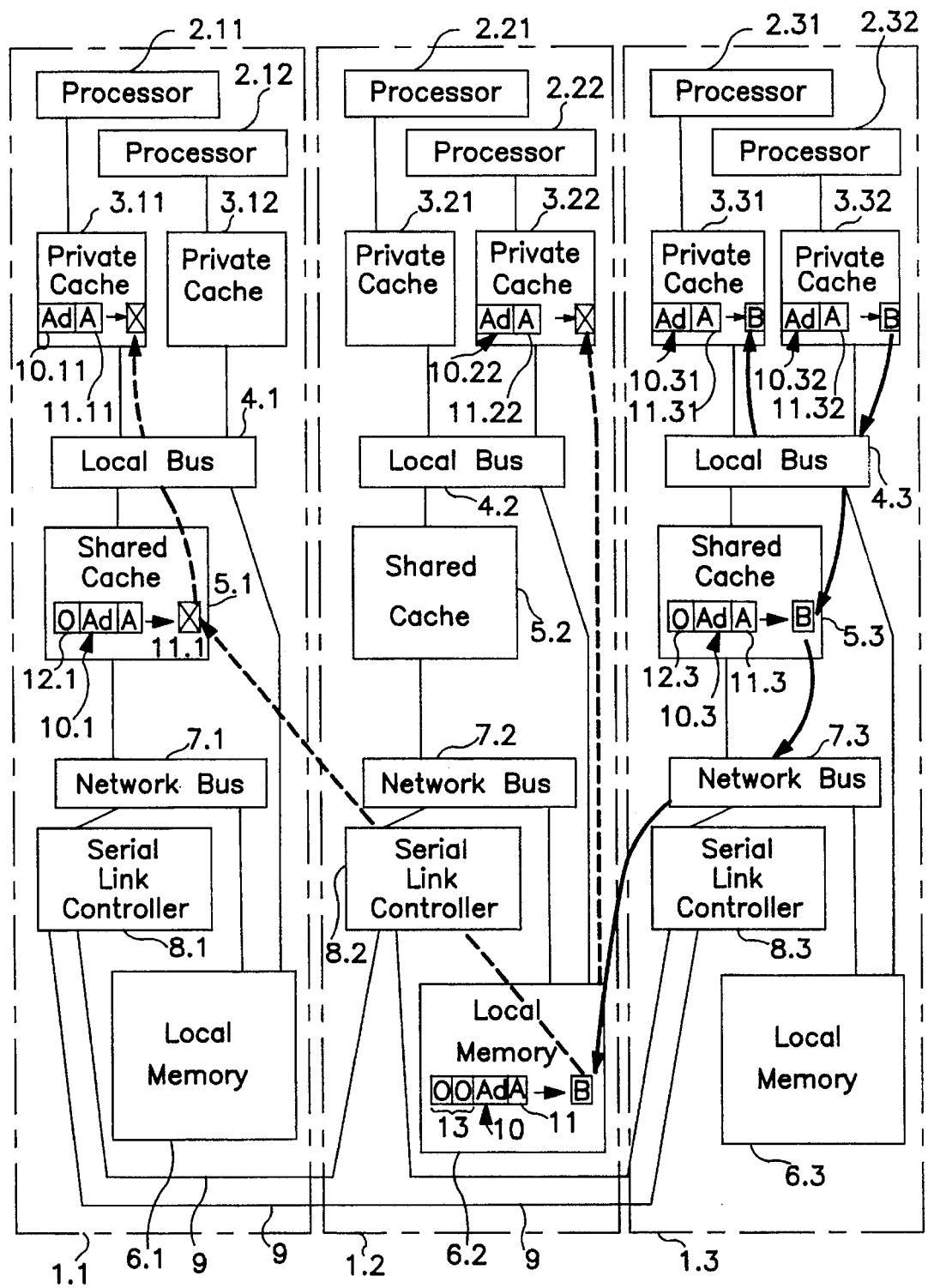
FIG. 1 is a schematic diagram illustrating the process according to the invention, in relation to a hierarchy of memories with three levels.

In reference to FIG. 1, the process according to the invention will be described in relation to a data processing system with shared memory, or in other words a system in which the general memory to which all the processors must be able to have access is divided into local memories to which each of the processors can have direct or indirect access. In the mode of implementation which will be described, the processors and the memories are, moreover, grouped into nodes that are associated with one another by means of links.

The data processing system illustrated comprises three nodes symbolized by a rectangle outline with a light dot-and-dash line with the general reference numeral 1. In order to permit a specific identification of the nodes, the general reference numeral is joined to a specific reference numeral 1, 2 or 3, so that the complete reference numeral of each node appears respectively as 1.1, 1.2 and 1.3.

For the requirements of the description three nodes have been illustrated, but the invention is not limited to this number. On the contrary, the process according to the invention that will be shown below permits the implementation of a system with a very large number of nodes, each of which groups together a number of processors that is not limited to the number shown here, and in so doing achieves more powerful performance, in rough proportion to the total number of processors, whereas when traditional processes are used, performance is rapidly limited despite an increase in the number of processors.

DESCRIPTION OF THE PREFERRED EMBODIMENTS

In reference to FIG. 1, each node 1 comprises two instruction processors with the general reference numeral 2 to which a specific two-digit reference numeral is joined, thereby permitting a processor to be identified by the node to which it belongs (first digit of the specific reference numeral), and by a sequence number within the node (second digit of the specific reference numeral). Thus, the different processors have the complete reference numerals 2.11 and 2.12 for the node 1.1; 2.21 and 2.22 for the node 1.2; and 2.31 and 2.32 for the node 1.3.

Each processor is directly linked to a memory which hereinafter will be called a private cache, or a memory on the higher level in the hierarchy. It is known that the term cache is commonly used to designate a memory consisting of blocks in which the pieces of information held at an address in the general memory of the data processing system are copied so that a specific instruction processor could use this information more rapidly than if it had to systematically interrogate the general memory each time it executed an instruction using this information. In the sense of the present description, the term private cache, or memory on a higher level in the hierarchy, will be used for a cache which has an instruction processor directly linked to it. The private caches have the general reference numeral 3, and by way of analogy with the processors to which they are linked, they have the specific reference numerals 3.11 and 3.12 for the node 1.1; 3.21 and 3.22 for the node 1.2; 3.31 and 3.32 for the node 1.3.

The private caches 3 are linked within each node to a parallel bus with the general reference numeral 4 to which a specific reference numeral is assigned to identify it in relation to the node, so that the buses 4 have, respectively, the complete reference numerals 4.1, 4.2 and 4.3. The same numbering system will be used hereinafter for all the elements of a node. The buses 4 will hereinafter be called local buses in order to show that they assure a link that is entirely internal to the node. The local buses 4 are low-latency buses, for example 16-byte buses at 50 MHz.

Each local bus is linked to a cache which will hereinafter be called a shared cache. The shared caches constitute memories at an intermediate level in the hierarchy and are identified by the general reference numeral 5 and respectively the complete reference numerals 5.1, 5.2 and 5.3. Each local bus is also linked to a part of the general memory of the data processing system. Each part of the general memory will hereinafter be called a local memory in order to illustrate its position within a node. The local memories are identified by the general reference numeral 6 and respectively the complete reference numerals 6.1, 6.2 and 6.3.

In the preferred mode of implementation shown, the shared caches 5 and the local memories 6 are connected to the parallel buses 7, respectively 7.1, 7.2 and 7.3. The parallel buses 7 will hereinafter be called network buses. Each network bus is associated with a serial link controller 8, respectively 8.1, 8.2 and 8.3, which forms an interface with the serial links 9 that assure linkage between the nodes.

Management processors are associated with each of the memories on the different levels, but they have not been represented so as not to overload the diagram. The terms "higher level in the hierarchy", "intermediate level in the hierarchy" and "lower level in the hierarchy" have no relation to the geographic disposition of the levels in the hierarchy of memories, but instead signify a more or less direct relation to the instruction processors. In particular, the local memories 6 will preferably be physically disposed adjacent to the shared caches 5. It must be noted with regard to this that despite the direct link between a local memory 6 and the corresponding local bus 4 within a node, the local memory constitutes a memory on the lower level in the sense of the invention. To simultaneously access different information within the same node would in effect necessitate copying the information contained within the local memory of the same node, in other words the local memory 6.2 in the example considered, into the shared cache of a node, for example into the shared cache 5.2. It will be observed that in this case the copies contained in the shared cache 5.2 will be considered to be copies in a memory at the intermediate level in the hierarchy just like the copies created from the local memories of the other nodes, although a processor in the node 1.2 would be able to directly access the information in the local memory.

As a general rule, the local memories 6 on the lower level in the hierarchy are memories with less costly technology and greater capacity, whereas the private caches 3 on the higher level in the hierarchy are memories with more costly technology and very fast access but with a relatively much smaller size than the memories 6 so as not to unduly increase the cost.

In operation, the information initially contained in a memory 6, for example a piece of information contained in a block 10 and illustrated by a series of bits 11 associated with an address Ad, are progressively copied into the corresponding blocks (respectively 10.1, 10.3, 10.11, 10.22, 10.31 and 10.32) on the higher levels in the hierarchy and are associated with the same address Ad in accordance with the requests made by the instruction processors so that they are immediately available to the instruction processors. In the example shown, the piece of information A has thus been copied into the memories of blocks 10.1 and 10.3 of the corresponding shared caches, respectively 5.1 and 5.3 at the intermediate level in the hierarchy, then into the blocks 10.11, 10.31 and 10.32 of the private caches, respectively 3.11, 3.31 and 3.32 on the higher level in the hierarchy. In relation to the copy in block 10.22 of the private cache 3.22, this can be executed directly since the private cache 3.22 has a direct access to the local memory 6.2 which is located in the same node. Thus the instruction processors 2.11, 2.22, 2.31 and 2.32 operate autonomously on the same information, and when a piece of information is modified on the higher level in the hierarchy, such as in block 10.32, or the information has been modified from A to B, it is desirable a priori to update the information on the lower level in the hierarchy, in other words in the local memory 6.2, as illustrated by the bold descending arrows. The blocks of all the other memories 3 could also be systematically updated. Nevertheless, if an update is executed in all the other memories on the higher level in the hierarchy each time one of the instruction processors 2 modifies the information, it results in a considerable rate of updating messages on the links, which threatens to cause a delay for the instruction processors.

If conversely an invalidation is executed in all the memories 3, the subsequent interrogations by the instruction processors 2 will lead to misses, which will also slow down the operation of the instruction processors.

According to the invention, at least some of the information at the corresponding addresses in other memories on the higher level in the hierarchy is invalidated, and either an update or an invalidation on the information at the corresponding addresses on the intermediate level and the lower level in the hierarchy is managed, depending on the usefulness of the update.

In particular, in the preferred mode of execution illustrated by FIG. 1, the blocks at corresponding addresses of the memories 3 on the higher level in the hierarchy of the node to which the modified block belongs are updated, while the blocks at corresponding addresses of the memories on the higher level in the hierarchy of the other nodes are invalidated. In the example illustrated, it is assumed that the modification came from the processor 2.32 and therefore was first executed in the private cache 3.32. According to the invention, the information has therefore been updated in the block 10.31 of the private cache 3.31 while the information contained in block 10.11 of the private cache 3.11 and in block 10.22 of the private cache 3.22 have been invalidated.

It will be observed that updating block 10.1 of the shared cache 5.1 is not necessarily useful if the information A, although having been copied previously in order to be used by the processor 2.11, is no longer being used by it and thus is no longer the object of inquiries.

In one advantageous aspect of the invention, the processing mode is adapted as a function of the usefulness of the updates. To do so, in a first version of the invention, the copies of the information held in the blocks of the memories 5 are normally processed according to a protocol in an update mode, and one data bit 12 is associated with each block at the intermediate level in the hierarchy, that is, a data bit 12.1 for block 10.1 and a data bit 12.3 for block 10.3. The data bit 12 is put in a first state during a first copy, or an update, of the information associated with this address, for example at condition 0 as illustrated in FIG. 1, and is put in a second state, for example at condition 1, during an inquiry about the piece of information associated with this address. In practice, when an update is executed by the management processor of the memory 6.2 on the lower level in the hierarchy, an acknowledgement is given by the block where the update has just been executed, and thus it is easy to include in the acknowledgement message an indication of the state of the data bit just before the update. This status of the data bit therefore indicates the usefulness of the preceding update for this block. In effect, if the address has been consulted since the preceding update the data bit of the block will move to 1, whereas if the address has not been consulted the data bit of the block will remain at 0.

This indication can be used in different ways, in particular the use can depend on the number of blocks on the intermediate level in the hierarchy which are linked to each block on the lower level in the hierarchy, or according to the foreseeable degree of information sharing between the different instruction processors. Preferably, the operation mode of the protocol will not be modified in consideration of the usefulness of an update of a single block, but rather in consideration of the usefulness of an update of all the blocks on the intermediate level which have the same address.

In particular, according to a first implementation of this version of the invention, an update threshold is memorized, for example in a directory (not shown) associated with the management processor of the memory 6.2 on the lower level in the hierarchy, and after each update the percentage of the data bits in the second state are compared to the update threshold; and when the percentage of the data bits in the second state is lower than the update threshold, the processing protocol is directed to the invalidation mode for all the blocks with the same address on the intermediate level in the hierarchy, or, when the percentage of the data bits in the second state is at least equal to the update threshold, the processing protocol is kept in the update mode on the higher level in the hierarchy.

Figures 2, 3:
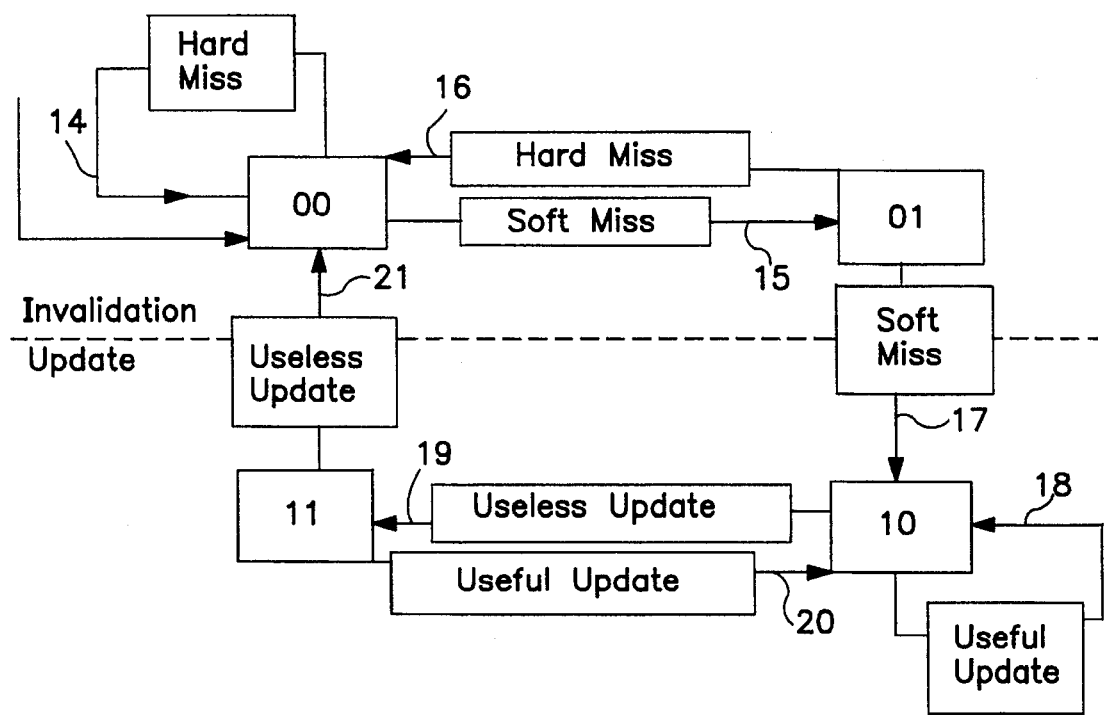
FIG. 2 is a table illustrating the second mode of implementation of the first version of the invention.
FIG. 3 is a schematic diagram illustrating a strategy for updating and invalidation in the case of a fine analysis of the situation.

In a second implementation of this version of the invention, which is illustrated by the table in FIG. 2, the number of data bits in each of the states, rather than the percentage of the data bits in the second state, is taken into consideration, and this time two thresholds are memorized. The number of data bits in the first state, in other words the number of data bits associated with blocks which have not been consulted since the preceding update and for which this update has thus been of no use, is compared to a first threshold S1. The number of data bits associated with the blocks which have the same address and which have been consulted by the instruction processor to which the memory is linked so that the preceding update has been useful, is compared to a second threshold S2, which is preferably lower than the first threshold S1.

The processing mode of the protocol is kept in update mode or is passed into invalidation mode depending on the result of these comparisons. In the preferred mode of implementation illustrated in FIG. 2, passage into the invalidation mode is activated as soon as the number of data bits in the second state is lower than the second threshold S2, no matter what the number of data bits in the first state. When a situation arises in which the number of data bits in the second state is higher than the second threshold S2 and the number of data bits in the first state is simultaneously lower than the first threshold S1, the protocol is kept in the update mode. If the number of data bits in the second state is higher than the second threshold, and if the number of data bits in the first state is also higher than its threshold S1, the protocol is still kept in the update mode but an invalidation is executed momentarily so as to relieve the memories of a large number of copies which are apparently of no use and which have no reason to be updated if they are not rerequested by the corresponding instruction processor before the next update. It will be noted with regard to this that while in an update mode the protocol in any case only updates the copies for which there is a block on the intermediate level in the hierarchy that has the same address as the block of the lower level which is the object of a modification.

The version of the invention which has just been described by its two particular modes of implementation has a statistical operation which effectively diminishes the rate of update messages if a large number of processors only use a piece of information a limited number of times, but increases the miss rate of the interrogations at the intermediate level if a limited number of processors utilize the information frequently while a large number of processors utilize it less frequently. After having passed into the invalidation mode, it is therefore preferable, if this proves to be useful, to be able to return to an update mode.

To accomplish this, according to a second version of the invention, a code which evolves in a way that will be explained below is associated with each address on the lower level, depending on the usefulness of the updates while the protocol is in the update mode, and on the nature of the misses while the protocol is in the invalidation mode.

For implementing this second version of the invention, the mode of the protocol must be made to evolve as a function of the code of the address under consideration on the lower level in the hierarchy.

In reference to FIG. 1, each block 10 of the lower level comprises a zone 13 consisting of two bits which form a code. FIG. 3 illustrates an example of the evolution of this code and the choice of the corresponding mode of operation of the protocol. FIG. 3 shows the different values that are possible for the two bits of the code associated with an address on the lower level. These values are divided into two separate groups by a dotted line. The values above the dotted line correspond to a protocol in the invalidation mode, and the values below the dotted line correspond to a protocol in the update mode.

In order to illustrate the evolution of the value of the code and its effect on the mode of the protocol, it will be assumed that when a piece of information held in a block 10 of a memory 6 on the lower level has not yet been copied, the two bits of the code are at zero and the protocol of the relations with the memories at the intermediate level is in the invalidation mode.

Based on this situation, an instruction processor, for example the processor 2.11 which needs the information at the address Ad, will request it from the private cache 3.11 which, not having the information at its disposal, will in turn make the request to the shared cache 5.1 (it will be assumed with regard to this that the requested information is not contained in the local memory 6.1 but in the local memory of another node, for example the local memory 6.2 in the case illustrated). As the shared cache 5.1 does not have the information at its disposal, the management processor of the memory 5.1 will thus have to request the information from the memory 6.2 by means of the network bus 7.1, the serial link controller 8.1, the serial line 9 which links it to the serial link controller 8.2, and the network bus 7.2. During this interrogation the management processor of the shared cache 5.1 signals to the management processor of the local memory 6.2 not only that the information is missing from the shared cache 5.1 but also that there is no block that contains the address Ad. This situation, symbolized by the arrow 14 in FIG. 3, will hereinafter be called a hard miss, meaning that the corresponding state memorized in the code of the zone 13 of block 10 will remain at the value 00 and the protocol of the relations for the address Ad between the memory 6.2 and the memories 5 will remain in the invalidation mode. If this information is rarely used, the management processor of the shared cache 5.1 will later execute an erasure of the address so that if a new interrogation is later executed on this information by the processor 2.11, it will again be a hard miss situation. It will be the same each time a new processor requests a copy of the information.

It will now be assumed that the information has been successively copied into two blocks 10.1 and 10.3 on the intermediate level and that one of the processors, for example 2.32 as illustrated in FIG. 1, modifies the information that passes from A to B. By a protocol of descending relations, the basic piece of information in block 10 is also modified, but since the code of block 10 remains at 00, the protocol of ascending relations, namely from the memory 6.2 toward the memories 5, is left in the invalidation mode, and the information in block 10.1 is simply invalidated while the address Ad is kept in block 10.1.

If in this situation the information is requested by the processor 2.11, the management processor of the memory 5.1 will confirm the presence of the address but will not be able to yield the associated piece of information that has been invalidated. Therefore it will be necessary to reinterrogate the memory 6.2 in order to have the updated piece of information, but this interrogation will be executed while stating that the address Ad is still present in block 10.1. This situation will hereinafter be called a soft miss, and one of the bits in the code will be modified so that the code will take on the value 01 as indicated by the arrow 15 in FIG. 3. In will be observed in FIG. 3 that for this code, the protocol of the relations for the address Ad in the direction leading from the memory 6.2 toward the memories 5 remains in the invalidation mode so that a subsequent interrogation of block 10.1 after the piece of information has been modified by a processor other than the processor 2.11 will again correspond to a soft miss if the address 10.1 has been retained, and to a hard miss if the address 10.1 has been deleted in the meantime. The situation which corresponds to a hard miss, meaning that the code in block 10 returns to the value 00, is represented by the arrow 16 in FIG. 3.

Conversely a soft miss is represented by the arrow 17 in FIG. 3. A soft miss takes a code with a value 01 to the value 10, and the ascending relation protocol associated with the address Ad then switches modes in order to switch into update mode.

Subsequent modifications of the information by one of the instruction processors 2 will be followed on the intermediate level in the hierarchy by updates in each of the memories 5, and the interrogations made in the shared caches 5 will thus be hits rather than misses. The question that arises from this situation is whether or not it remains useful to execute updates. The misses which could result from processors requesting the information for the first time are no longer taken into account, and therefore the criteria for determining the usefulness of updates which have been described in connection with the first version of the invention are applied, which means that with each update in a block of a memory 5 the acknowledgement signal transmits the state of the data bit 12. For each address, the management processor of the memory 6 analyzes the state of all the data bits in accordance with one of the modes of implementation described above, and from this it deduces the global usefulness of the update.

If the update corresponding to the state of the data bits has been useful, the value of the code is kept at 10 as shown by the arrow 18 in FIG. 3, and the ascending relation protocol of course remains unchanged. If the update has been globally useless, the value of the code is modified to 11 as shown by the arrow 19 in FIG. 3.

If in the next update the data bits have evolved and translate into a useful update, the code is returned to the value 10 as shown by the arrow 20 in FIG. 3. If conversely it is apparent from a code with a value 11 that during the next update the data bits have not evolved in a favorable direction and that therefore the update that immediately preceded it has been of no use, the code takes on the value 00 as shown by the arrow 21 in FIG. 3, and the protocol of the ascending relations is again brought into an invalidation mode. Thus the situation described above has recurred.

It is apparent that this second version of the invention permits the protocol of the ascending relations to be switched from one mode to the other, but in such a way that the change of mode does not occur too frequently, which permits optimization of the flow of messages on the links between the memories.

It will be noted that the initialization is not necessarily done with the code 00. On the contrary, it can foreseeably be done with another code, which evolves from this code by the process described above.

It will also be noted that different addresses can be in distinct modes depending on the situation of the copies in relation to the information associated with the address in question.

It is understood that the invention is not limited to the versions of the invention described above and variant implementations may be achieved without going outside the scope of the invention as defined by the claims.

In particular, within a node it may be considered either that the shared cache may serve as intermediate level vis a vis the local memory of the same node, or conversely that private caches may be integrated into an intermediate level in the hierarchy. In this case, for the addresses in the local memory of the node, a data bit could foreseeably be associated with each of the corresponding blocks of the private caches of this node, and an update or an invalidation could be executed in the private caches of the node depending on the state of these data bits.

If, quite the opposite, the information that is initially held in one of the local memories is utilized and modified by one of the processors exclusively, the management processor of the local memory can inform the private cache corresponding to the processor that it is the only memory in possession of the information and that it is not necessary to bring the successive modifications back down to the local memory, which is restricted to invalidating the information until it is requested by another processor.

Although the invention has been described in connection with a data processing system in which the local memory is directly linked to the local bus within each node, it also applies to memories in which the lower level in the hierarchy is exclusively linked to the intermediate level in the hierarchy.

It is also possible to anticipate different strategies for moving between the update mode and the invalidation mode, for example while increasing the number of possible values for the code associated with each address of the memories 6. It is still necessary to watch that the strategy not become too complex and not overly complicate the operation of the management processor of the memories; then the request could no longer be met and the result in turn would be a delay.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A process for coherent management of exchanges between the levels in a hierarchy of memories comprising at least one intermediate level in the hierarchy, linked to a higher level in the hierarchy and to a lower level in the hierarchy, with each level in the hierarchy being divided into memories (3, 5, 6) which are in turn divided into blocks (10) containing pieces of information (11) associated with addresses (Ad), with the blocks of the memories on a higher level and at the intermediate level in the hierarchy containing copies of the information held in the blocks at the corresponding addresses on a lower level in the hierarchy, the process comprising, during a modification of a piece of information in a block (10.32) of a memory on a higher level in the hierarchy, invalidating at least some of the information with corresponding addresses of other memories on the higher level in the hierarchy, and managing either an update or an invalidation of the information at the corresponding addresses on the intermediate level and on the lower level in the hierarchy, in accordance with the usefulness of the update.

2. The process of claim 1 in connection with a data processing system in which the memories at different levels in the hierarchy are grouped into nodes, further including modifying a piece of information in a block (10.32) of a memory at a higher level in the hierarchy, updating the blocks (10.31) at corresponding addresses in the memories on the higher level in the hierarchy of a node (1.3) to which the modified block belongs, and invalidating the blocks (10.11; 10.22) at the corresponding addresses in the memories on the higher level in the hierarchy in the other nodes (1.1, 1.2).

3. The process of claim 1, including processing copies of the information held in the blocks at corresponding addresses on an intermediate level in the hierarchy according to a protocol in an update node, and characterized in that associated with each block on the intermediate level in the hierarchy is a data bit (12) which is placed in a first state during a first copy of information or an information update in said block and is placed in a second state during a utilization of the information contained in said block; and that during a modification of a piece of information at an address on a lower level in the hierarchy, an update is executed for the blocks at the corresponding address on the intermediate level in the hierarchy, and the processing protocol is either kept in the update mode or switched to an invalidation mode depending on the usefulness of a preceding update at said address, this usefulness of the preceding update being determined as a function of the state of the data bits in the blocks with the same address just prior to the update in question.

4. The process of claim 2, including processing copies of the information held in the blocks at corresponding addresses on an intermediate level in the hierarchy according to a protocol in an update node, and characterized in that associated with each block on the intermediate level in the hierarchy is a data bit (12) which is placed in a first state during a first copy of information or an information update in said block and is placed in a second state during a utilization of the information contained in said block; and that during a modification of a piece of information at an address on a lower level in the hierarchy, an update is executed for the blocks at the corresponding address on the intermediate level in the hierarchy, and the processing protocol is either kept in the update mode or directed to an invalidation mode depending on the usefulness of a preceding update at said address, this usefulness of the preceding update being determined as a function of the state of the data bits in the blocks with the same address just prior to the update in question.

5. The process of claim 3, including memorizing an update threshold on the lower level and memorizing the protocol in the update mode when the percentage of the data bits in the second state is at least equal to the update threshold, and the protocol is directed to the invalidation mode when the percentage of data bits in the second state is lower than the update threshold.

6. The process of claim 4, including memorizing an update threshold on the lower level and memorizing the protocol in the update mode when the percentage of the data bits in the second state is at least equal to the update threshold, and the protocol is directed to the invalidation mode when the percentage of data bits in the second state is lower than the update threshold.

7. The process of claim 3, including memorizing a first threshold and a second threshold on a lower level in the hierarchy and maintaining the processing protocol in the update mode or switching said processing protocol to an invalidation mode as a function of an actual number of data bits in the first and second state in comparison with the first and second threshold.

8. The process of claim 4, including memorizing a first threshold and a second threshold on a lower level in the hierarchy and maintaining the processing protocol in the update mode or directing said processing protocol to an invalidation mode as a function of an actual number of data bits in the first and second state in comparison with the first and second threshold.

9. The process of claim 7, characterized in that the protocol is directed to the invalidation mode when the number of data bits in the second state is lower than the second threshold.

10. The process of claim 8, characterized in that the protocol is directed to the invalidation mode when the number of data bits in the second state is lower than the second threshold.

11. The process of claim 9, characterized in that when the numbers of data bits in the first and in the second state are respectively higher than the first and second threshold, an invalidation of the information in the blocks on the higher level in the hierarchy is executed momentarily, while the protocol is kept in an update mode.

12. The process of claim 10, characterized in that when the numbers of data bits in the first and in the second state are respectively higher than the first and second threshold, an invalidation of the information in the blocks on the higher level in the hierarchy is executed momentarily, while the protocol is kept in an update mode.

13. The process of claim 1, characterized in that associated with each block on the intermediate level in the hierarchy is a data bit (12) which is placed in a first state during a first copy of information or an information update in said block and which is put in a second state during a utilization of the information contained in said block; that associated with each address on the lower level in the hierarchy is a code (13) which evolves as a function of the usefulness of an update when the copies of the information contained in the blocks on the intermediate level in the hierarchy are processed according to a protocol in an update mode, or as a function of the nature of a miss when the copies of the information contained in the blocks on the intermediate level in the hierarchy are processed according to a protocol in an invalidation mode, the usefulness of an update being determined as a function of the state of the data bits and the nature of a miss being determined by a total absence of information and addresses in the memory on the intermediate level in the hierarchy or by an invalidated piece of information in a block of this memory; and that the mode of the protocol is made to evolve as a function of the code of the address under consideration on the lower level in the hierarchy.

14. The process of claim 2, characterized in that associated with each block on the intermediate level in the hierarchy is a data bit (12) which is placed in a first state during a first copy of information or an information update in said block and which is put in a second state during a utilization of the information contained in said block; that associated with each address on the lower level in the hierarchy is a code (13) which evolves as a function of the usefulness of an update when the copies of the information contained in the blocks on the intermediate level in the hierarchy are processed according to a protocol in an update mode, or as a function of the nature of a miss when the copies of the information contained in the blocks on the intermediate level in the hierarchy are processed according to a protocol in an invalidation mode, the usefulness of an update being determined as a function of the state of the data bits and the nature of a miss being determined by a total absence of information and addresses in the memory on the intermediate level in the hierarchy or by an invalidated piece of information in a block of this memory; and that the mode of the protocol is made to evolve as a function of the code of the address under consideration on the lower level in the hierarchy.

15. The process of claim 13, further including memorizing an update threshold on the lower level and measuring the usefulness of an update by comparing the percentage of the data bits in the second state to the threshold.

16. The process of claim 14, further including memorizing an update threshold on the lower level and measuring the usefulness of an update by comparing the percentage of the data bits in the second state to the threshold.

17. The process of claim 13, including memorizing a first threshold and a second threshold at a lower level and evolving a code as a function of an actual number of data bits in the first and the second states in comparison with the first and second thresholds.

18. The process of claim 14, including memorizing a first threshold and a second threshold at a lower level and evolving a code as a function of an actual number of data bits in the first and the second states in comparison with the first and second thresholds.

* * * * *